US011664051B1

(12) United States Patent
Zhou et al.

(10) Patent No.: US 11,664,051 B1
(45) Date of Patent: May 30, 2023

(54) HEAT-ASSISTED RECORDING HEAD HAVING MECHANICALLY ROBUST SUBWAVELENGTH MIRROR WITH PLASMONIC LINER

(71) Applicant: Seagate Technology LLC, Fremont, CA (US)

(72) Inventors: Nan Zhou, Chanhassen, MN (US); Michael Allen Seigler, Eden Prairie, MN (US); YongJun Zhao, Eden Prairie, MN (US); Huaqing Yin, Eden Prairie, MN (US); Michael C. Kautzky, Normandale, MN (US); Li Wan, Prior Lake, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/706,257

(22) Filed: Mar. 28, 2022

Related U.S. Application Data

(60) Provisional application No. 63/167,423, filed on Mar. 29, 2021.

(51) Int. Cl.
*G11B 5/31* (2006.01)
*G11B 13/08* (2006.01)
*G11B 5/00* (2006.01)

(52) U.S. Cl.
CPC ...... *G11B 13/08* (2013.01); *G11B 2005/0021* (2013.01)

(58) Field of Classification Search
CPC ......... G11B 5/012; G11B 27/36; G11B 5/314; G11B 2005/0021; G11B 13/08; G11B 5/3306

USPC .......................................................... 360/59
See application file for complete search history.

(56) References Cited

U.S. PATENT DOCUMENTS

| | | | |
|---|---|---|---|
| 7,596,072 | B2 | 9/2009 | Buechel et al. |
| 8,755,118 | B2 | 6/2014 | Chang-Hasnain et al. |
| 9,852,753 | B2 | 12/2017 | Peng |
| 9,911,441 | B1 * | 3/2018 | Jandric ............... G11B 5/314 |
| 9,934,800 | B1 | 4/2018 | Neira et al. |
| 10,068,596 | B2 | 9/2018 | Staffaroni et al. |
| 10,115,423 | B1 | 10/2018 | Gubbins et al. |
| 10,249,326 | B1 | 4/2019 | Peng |
| 10,360,939 | B2 | 7/2019 | Krichevsky et al. |
| 10,964,340 | B1 | 3/2021 | Chen et al. |
| 2006/0133230 | A1 | 6/2006 | Buechel et al. |
| 2013/0058370 | A1 | 3/2013 | Chang-Hasnain et al. |

(Continued)

*Primary Examiner* — Nabil Z Hindi
(74) *Attorney, Agent, or Firm* — Mueting Raasch Group

(57) ABSTRACT

A recording head has a near-field transducer proximate a media-facing surface of the recording head. A waveguide overlaps and delivers light to the near-field transducer. Two subwavelength focusing mirrors are at an end of the waveguide proximate the media-facing surface. The subwavelength mirrors are on opposite crosstrack sides of the near-field transducer and separated from each other by a crosstrack gap. The subwavelength focusing mirrors each include a core having a first edge exposed at the media-facing surface. The core formed of a core material that is resistant to mechanical wear and corrosion, such as a dielectric or robust metal. A liner covers a second edge of the core facing the near-field transducer. The liner includes a plasmonic metal that is different than the core material, such as Au or Al.

20 Claims, 8 Drawing Sheets

(56) References Cited

U.S. PATENT DOCUMENTS

2017/0249962 A1    8/2017  Peng
2021/0249039 A1    8/2021  Chen et al.

* cited by examiner

HEAT-ASSISTED RECORDING HEAD HAVING MECHANICALLY ROBUST SUBWAVELENGTH MIRROR WITH PLASMONIC LINER

RELATED PATENT DOCUMENTS

This application claims the benefit of U.S. Provisional Application No. 63/167,423, filed on Mar. 29, 2021, which is incorporated herein by reference in its entirety.

SUMMARY

The present disclosure is directed to a heat-assisted recording head having a mechanically robust subwavelength mirror with a reflective liner. In various embodiments, a recording head has a near-field transducer proximate a media-facing surface of the recording head. The near-field transducer extends a first distance away from the media-facing surface. A waveguide overlaps and delivers light to the near-field transducer. Two subwavelength focusing mirrors are at an end of the waveguide proximate the media-facing surface. The subwavelength mirrors are on opposite crosstrack sides of the near-field transducer and separated from each other by a crosstrack gap. The subwavelength focusing mirrors each include a core having a first edge exposed at the media-facing surface. The core formed of a core material that is resistant to mechanical wear and corrosion, such as a dielectric or robust metal. A liner covers a second edge of the core facing the near-field transducer. The liner includes a plasmonic metal that is different than the core material, such as Au or Al.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and excites the near-field transducer.

One challenge in developing in HAMR products involves wear of the optical components that can impact life of the drives. One cause for this is separation of parts and voiding within regions surrounding the NFT. The optical components in this region are subject to high temperatures and may become oxidized, which can cause voiding or separation of some materials. A HAMR write transducer described below uses a subwavelength mirror that overlaps part of the NFT in an area near the air bearing surface (ABS), which may also be referred to herein as a media-facing surface. Generally, the subwavelength mirror has dimensions along its reflecting surface (e.g., the length of curve that forms the reflective surface) that are smaller than the wavelength of the incident light (e.g., 830 nm).

The subwavelength mirror focuses incident waveguide light onto the NFT to assist waveguide-NFT coupling. The subwavelength mirror also functions as an optical side shield to block background light. Therefore, the laser current used for writing can be reduced and thermal gradient improved by addition of this mirror. In order to obtain optimum optical performance, the mirror can be made from a material such as Au that has good optical and thermal characteristics. However, it has been found that Au and similar plasmonic materials are subject to degradation in the NFT region. Therefore, the present disclosure describes additional features to increase robustness and durability of a subwavelength mirror.

Figure 1:
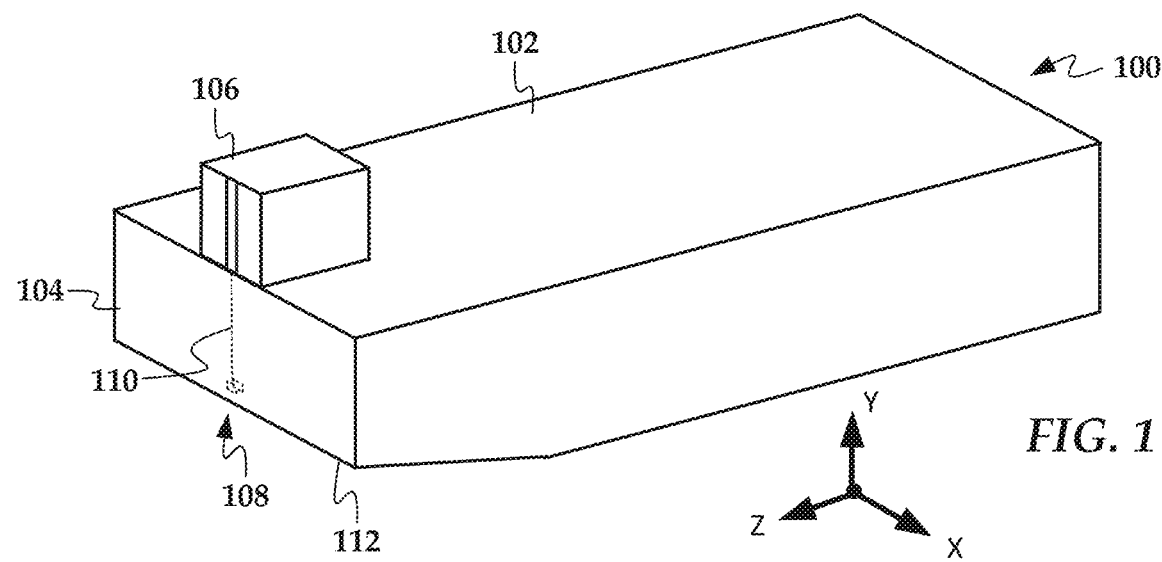
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot in the recording medium.

Figure 2:
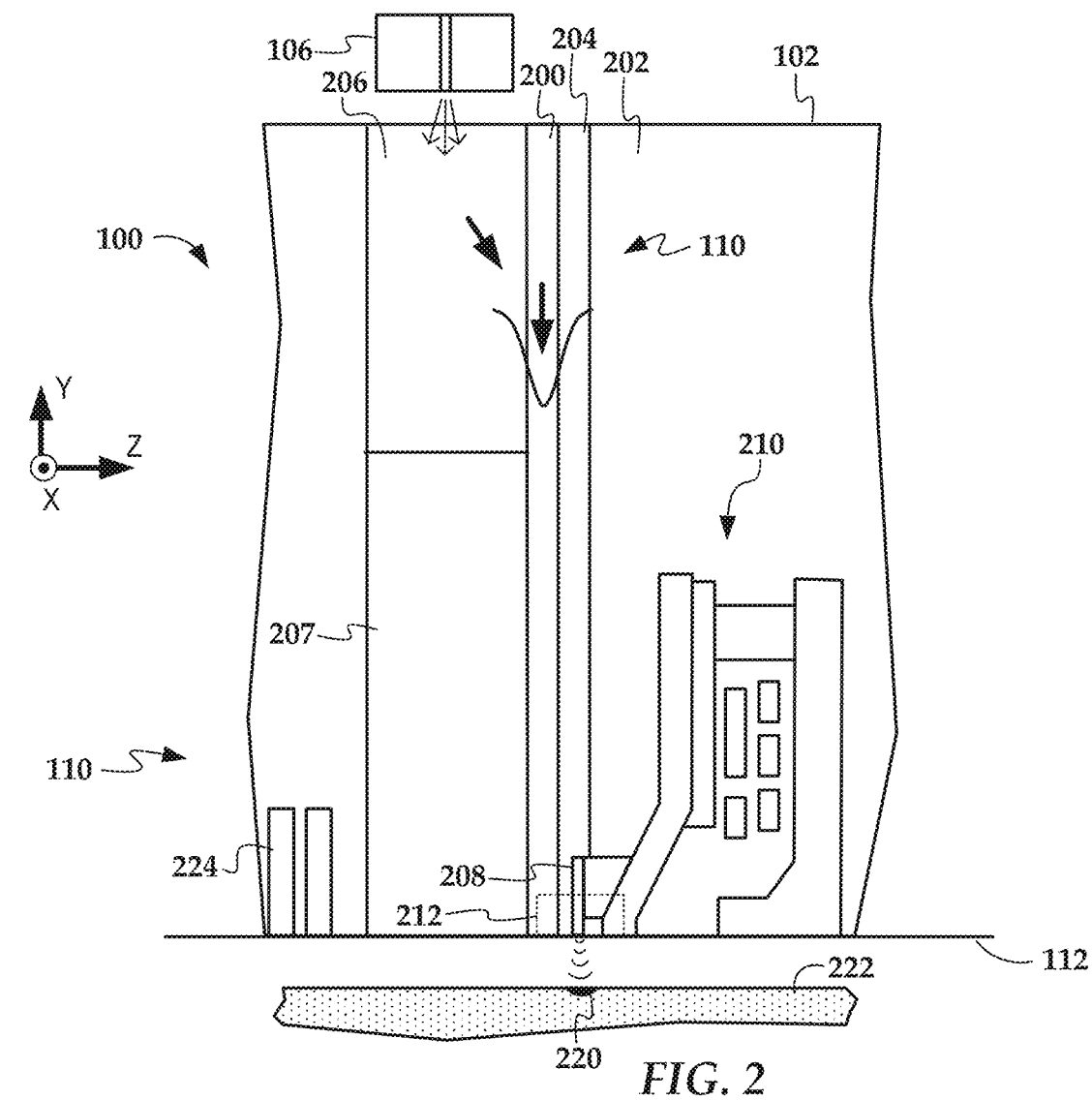
FIG. 2 is a cross-sectional view of a slider along a down-track plane according to according to an example embodiment.
Figure 3:
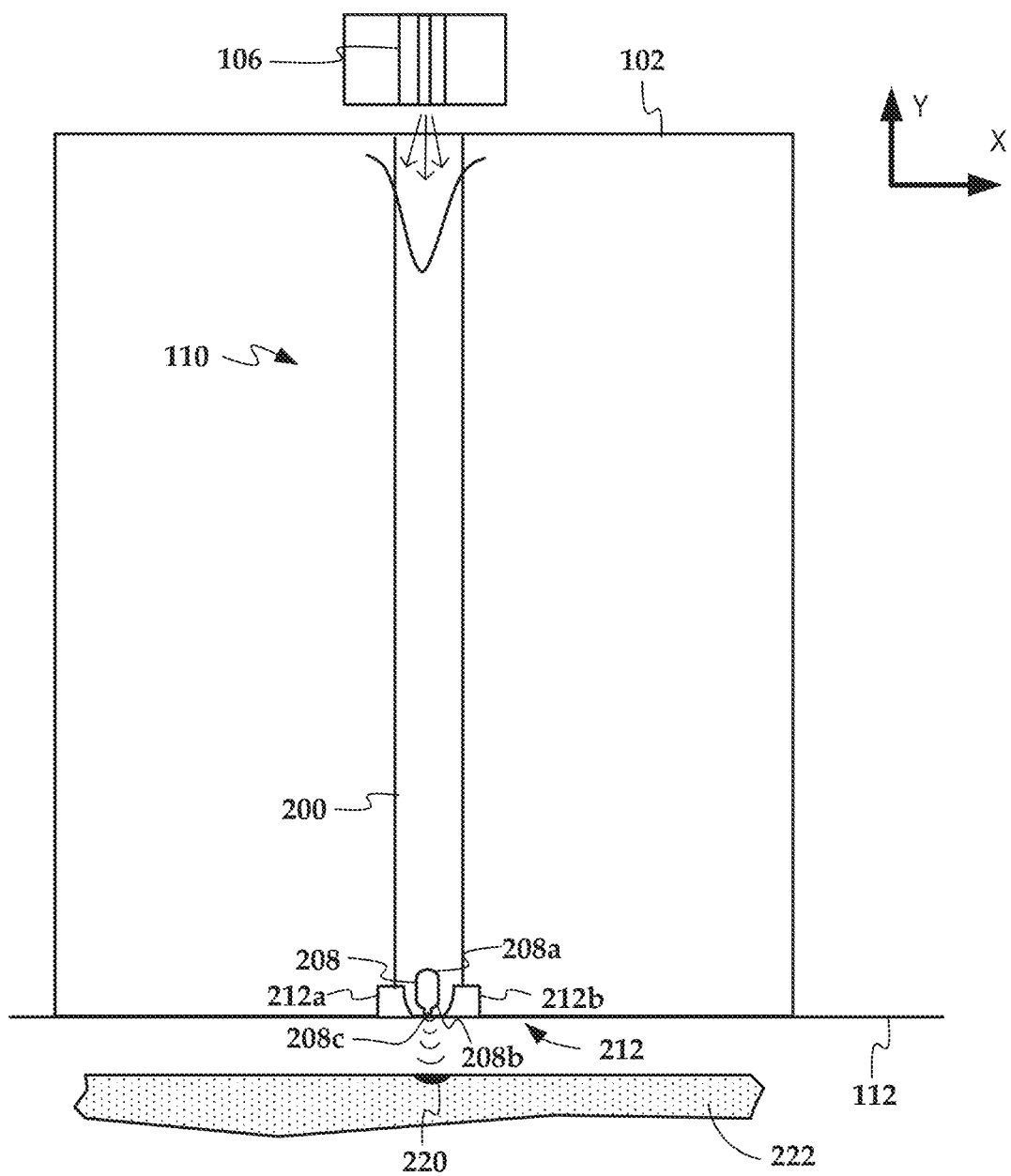
FIG. 3 is a wafer plane view of a slider according to an example embodiment.

In FIGS. 2 and 3, respective cross-sectional and wafer plane views of the slider body 102 show a light delivery system according to an example embodiment. The slider body includes an NFT 208, a magnetic writer 210 and a micro-sized focusing mirror assembly 212, referred to herein as a subwavelength mirrors, subwavelength focusing mirrors, subwavelength solid immersion mirrors (SIMs), mini-SIMs, etc. Light, emitting from the laser diode 106, is coupled into a three-dimensional, single mode channel waveguide 110 by a waveguide input coupler 206, which directs the light to a waveguide core 200. The input coupler 206 is replaced by a bottom cladding layer 207 towards the media-facing surface 112. Note that other waveguide and input coupler arrangements may be used with the NFT 208 and mirror assembly 212.

The NFT 208 has an enlarged part with two curved ends 208a, 208b and a protruded peg 208c. Other shapes may be possible for the enlarged part of the NFT 208, e.g., rectangular, triangular. The NFT 208 is placed proximate a side cladding layer 204 and top cladding layer 202 of the waveguide 110 and near the waveguide core 200. The NFT 208 could be also placed into the waveguide core 200. The NFT 208 achieves plasmonic resonance in response to the light coupled via the waveguide 110, and creates a small hotspot 220 on a recording medium 222 during recording.

A magnetic reader 224 is shown down-track from the NFT 208 and writer 210. The magnetic reader 224 may include a magneto-resistive stack that changes resistance in response to changes in magnetic field detected from the recording medium 222. These changes in magnetic field are converted to data by a read channel of the apparatus (e.g., hard disk drive assembly).

As best seen in FIG. 3, the subwavelength mirror assembly 212 includes mirrors 212a, 212b on either crosstrack side of the NFT 208. The mirrors 212a-b focus the incident waveguide light to the NFT 208 to assist in waveguide-NFT coupling. The mirrors 212a-b can also function as optical side shields that block background light from exiting the media-facing surface 112. The subwavelength mirrors 212a utilize combinations of soft plasmonic materials and hard materials that help improve performance and life of the recording head 100.

Figure 4:
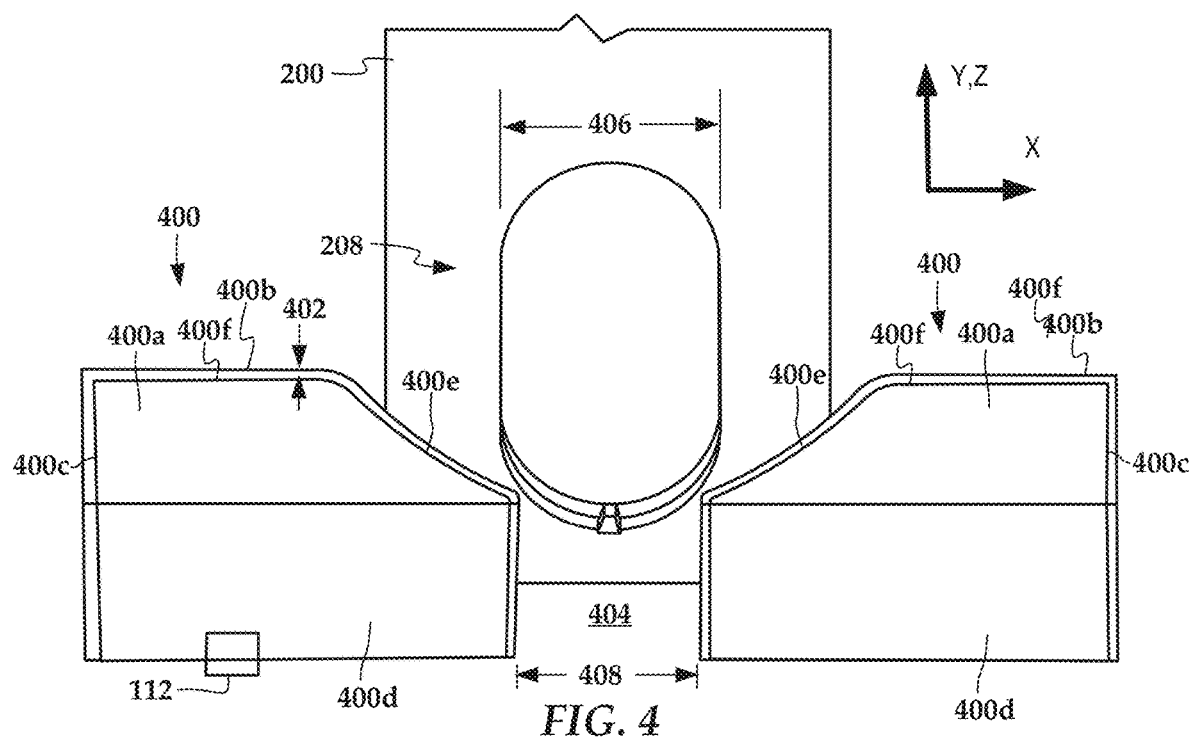
FIGS. 4 and 5 are perspective and plan views of a subwavelength mirror according to an example embodiment.
Figure 5:
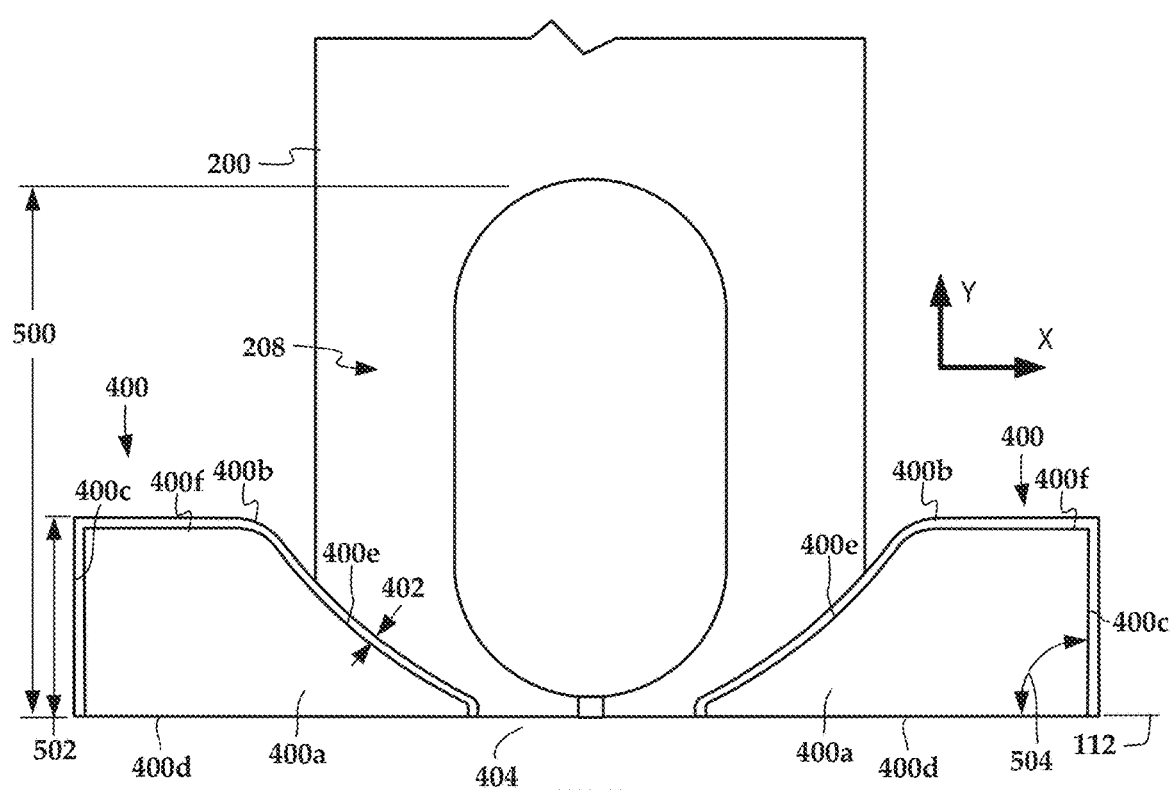

In FIGS. 4 and 5, diagrams illustrate details of a subwavelength mirror according to an example embodiment. The diagram in FIG. 4 is a perspective view seen from the media-facing surface 112 and the diagram in FIG. 5 is a plan view on a substrate-parallel plane. A pair of subwavelength focusing mirrors 400 is located at an end of the waveguide core 200 proximate the media-facing surface 112. The subwavelength focusing mirrors 400 are on opposite crosstrack sides of the near-field transducer 208 and separated from each other by a crosstrack gap 404. The width 408 of crosstrack gap 404 may be less than a corresponding crosstrack width 406 of the NFT 208. As seen in FIG. 5, the near-field transducer 208 extends a first distance 500 away from the media-facing surface 112 and the mirrors 400 extend a second distance 502 away from the media-facing surface that is less than the first distance 500. For example, the second distance 502 may be less than half of the first distance 500.

Each of the subwavelength focusing mirrors includes a core structure 400a extending from the media-facing surface 112 and a liner 400b (e.g., a plasmonic material) facing away from the media facing surface 112 and conformably surrounding the core structure 400a. The core structure 400a is a base structure that resembles the final shape of each subwavelength mirror 212, but it need not be made of reflective materials. Generally, the core structure 400a is made from a material that is resistant to mechanical wear and corrosion as part of it is exposed at the media-facing surface. The core structure 400a does not need good optical properties (e.g., reflectivity) however may be selected to have good thermal conductivity for heatsinking as well as being compatible with slider manufacturing processes.

As seen here, the liner 400b extends into the gap 404 and covers back edges 400c of the core 400a that face away from the NFT 208. The back edges 400c are at a non-zero angle 504 to the media-facing surface 112, e.g., 80°-100°. During manufacture, the liner 400b may cover all edges of the core 400a, and then the part of liner material at the media-facing surface can be removed during lapping of the recording head. Note that even though the terms core, base structure, etc. may be used to describe the core structure 400a, this does not imply any order of manufacture of these components. For example, in some embodiments the liner 400b may first be formed to define the shape of the mirrors 400, the liner 400b then being filled in with the material of the core structure 400a.

Note that the liner 400b will be formed within a surrounding dielectric material such as $SiO_2$ or AlO. Depending on the material of the liner 400b, a seed layer may first be formed in the cavity in which the liner will be deposited. For example, if the liner 400b is Au, a seed layer of Y or Ir, for example, may first be deposited in the cavity before layering in the Au. If the liner 400b is formed of Rh or Al, a seed layer may not be needed.

The liner 400b may be a plasmonic metal with good optical characteristics such as Au, Ag, Cu, Al or their alloys, but is not limited to these. These desirable optical characteristics may include reflectivity, as well as plasmonic resonance, as the mirrors 400 will interact with the plasmon fields generated by the NFT 208. The liner thickness 402 may be from 1 nm to 100 nm. In some embodiments, the liner thickness 402 is based on skin depth of the plasmonic metal, e.g., about twice the skin depth, less than four times the skin depth, etc. For Au, twice the skin depth is roughly 50 nm, and so 50 nm may be sufficient for an Au liner in some embodiments.

The liner 400b may cover all edges of the mirror 400 except a first edge 400d at the media-facing surface 112. A second edge 400e faces the near-field transducer 208 and the liner 400b covering this edge 400e couples light into the disk of the near-field transducer 208. A third edge 400f faces away from the media facing surface 112. The part of the liner 400b covering this edge 400f controls backscattering that could cause optical feedback into the laser. The liner 400b at the back edges 400c is an artifact of the fabrication process, but may provide some amount of reflection control, e.g., blocking crosstrack stray light from reaching the NFT 208.

The core 400a could be filled by optical quality dielectrics such as AlO and $SiO_2$, but is not limited to these materials as the sensitivity to the core's optical properties is negligible. The core 400a can be made with non-optical quality material. A non-optical quality material may have negligible impact on the performance due to the liner 400b and offers flexibility for the manufacturing process. The core 400a can be made from high thermal conductivity dielectrics like MgO and AlN, which can reduce temperatures at the liner 400b by heat sinking in the crosstrack direction. Other non-metallic core materials may include ceramics, crystalline carbon, etc. In other embodiments, the core 400a can be formed from a robust metal such as Rh, Ir, Pt, Pd, Ru, or their alloys, which can provide mechanical wear resistance, corrosion resistance, and heat sinking. Although some of these metals may be optically absorptive, the use of a plasmonic liner 400b and separation from the critical regions near the NFT 208 will not significantly affect coupling efficiency.

Figure 6:
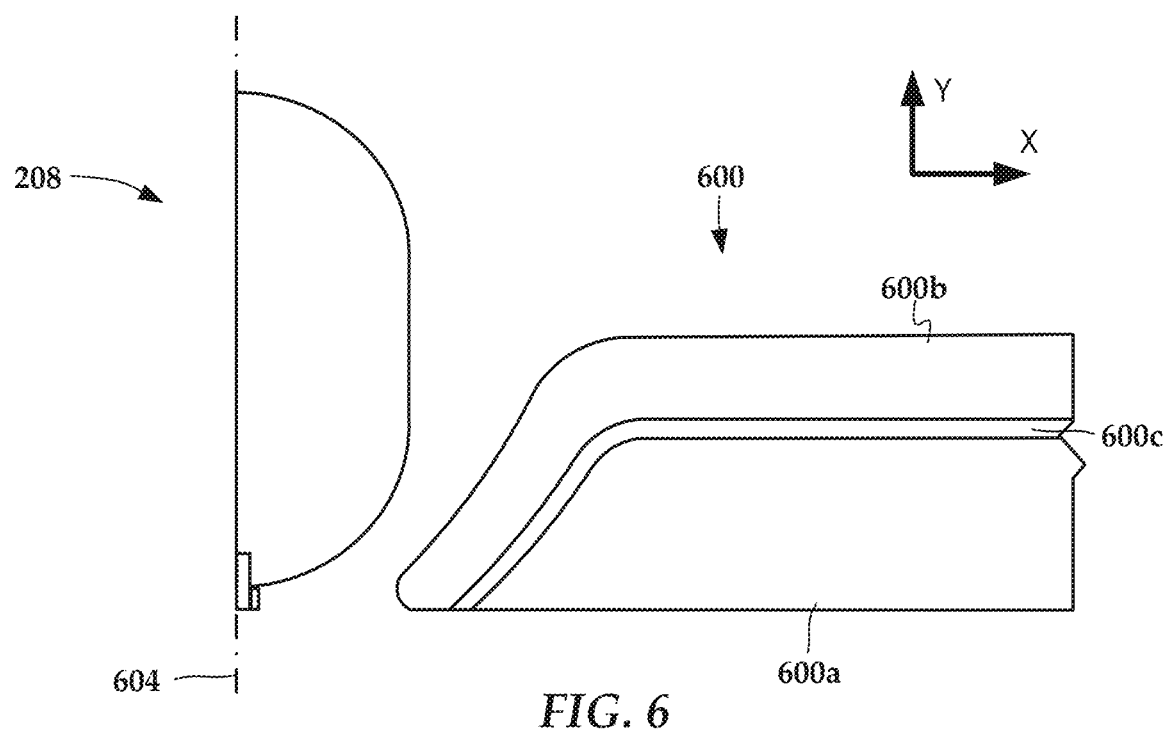
FIGS. 6 and 7 are plan and perspective views of a subwavelength mirror according to another example embodiment.

In FIG. 6, a plan view on a substrate-parallel plane shows details of a mirror 600 according to an example embodiment. This view shows one mirror 600 and half of the NFT 208, which are symmetrically duplicated around a crosstrack centerline 604. The mirror 600 includes a core 600a and liner 600b as described above. An intermediate layer 600c can be formed between the liner 600b and the core 600a to promote adhesion, conformity and stability with negligible performance penalty. The intermediate layer 600c may also act as a diffusion barrier between the core 600a and liner 600b. For example, if a dielectric core 600a is used with an Au liner 600b, then the intermediate layer 600c may be formed of Ru, which can promote adhesion. In another example, if a Rh core 600a is used with an Al liner 600b, then the intermediate layer 600c may be formed of a metal different than the core and liner 600a, 600b, and having a thickness between 5 and 30 nm. The intermediate layer 600c can prevent diffusion and intermixing between the two metals used to form the core 600a and liner 600b.

Generally, it is further desirable that the intermediate layer 600c does not form inter-metallics with the core and liner 600a, 600b, does not have chemical reactions with the core and liner 600a, 600b, can be small enough (e.g., thickness between 5 and 20 nm) to reduce optical and thermal penalties. The intermediate layer 600c should also tolerate conditions at the media-facing surface, e.g., compatible with surrounding slider materials (including overcoat), no undue protrusion, no non-passivating oxidation response, no corrosion response, etc. Similarly, the material of the core 600a should also be similarly tolerant of conditions at the media-facing surface, as well as having high thermal conductivity and manufacturable (e.g., plating feasibility).

If the intermediate layer 600c is a single layer structure, it may be formed of metals such as Co, Ru, Ti, Cr, Pt, W, Ta, or TiWx, or alloys thereof, or nitrides such as TiNx, TaNx, AlNx, ZrNx, WNx, or HfNx. Any of these metals or nitrides can be combined into a bilayer or multilayer structure that collectively forms the intermediate layer 600c. An intermediate layer 600c of these compositions should be compatible with an Al liner 600b and a core 600a of Au or AuX alloy, Cu or CuX alloy, Pt, Cr, or magnetic alloys currently used for conventional magnetic recording heads such as NiFE20, NiFe55, CoNiFe, FeCo, Ni, or NiCo.

In another embodiment, the intermediate layer 600c may be formed of an oxide that includes the metal of the liner 600b. For an Al liner 600b, the intermediate layer 600c may be a native Al oxide (e.g., $Al_2O_3$) that is formed by natural oxidation, plasma oxidation, ozone exposure, ultraviolet exposure, or radical shower. In another embodiment, the intermediate layer 600c may be formed of an alloy that includes the metal of the liner 600b, such as an Al alloy (e.g., AlMg) for an Al liner.

Figure 7:
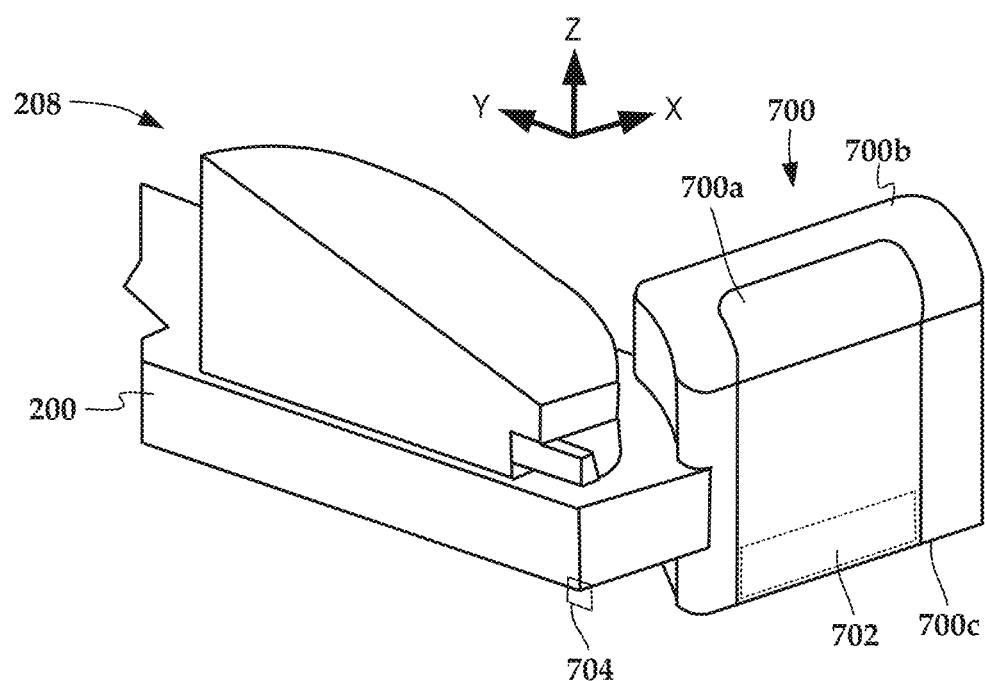

In FIG. 7, a perspective view shows details of a mirror 700 according to an example embodiment. This view shows one mirror and half the NFT 208, which are symmetrically duplicated around a crosstrack center plane 704. The mirror 700 includes a core 700a and liner 700b as described above, and may also include an adhesion layer as shown in FIG. 6, but is not shown in FIG. 7. In one embodiment, the core 700a and liner 700b are built up from a bottom face 700c which lies on a substrate parallel plane (xy-plane). In another embodiment, a layer 702 may be deposited within the liner 700b on the bottom face 700c, and the layer 702 may be made of the same material as the liner 700b (e.g., Au or another plasmonic material as described above). Generally, the layer 702 covers a major surface of the core 700a, the major surface facing away from the near-field transducer in a downtrack direction. The layer 702 may provide heat sinking for the mirror 700, transferring heat to a layer of material below the mirror 700. Note that this view shows the mirror 700 intersecting with the waveguide core 200, such that part of the liner 700b (and possibly part of the core 700a) is embedded in the core 200.

Figure 8:
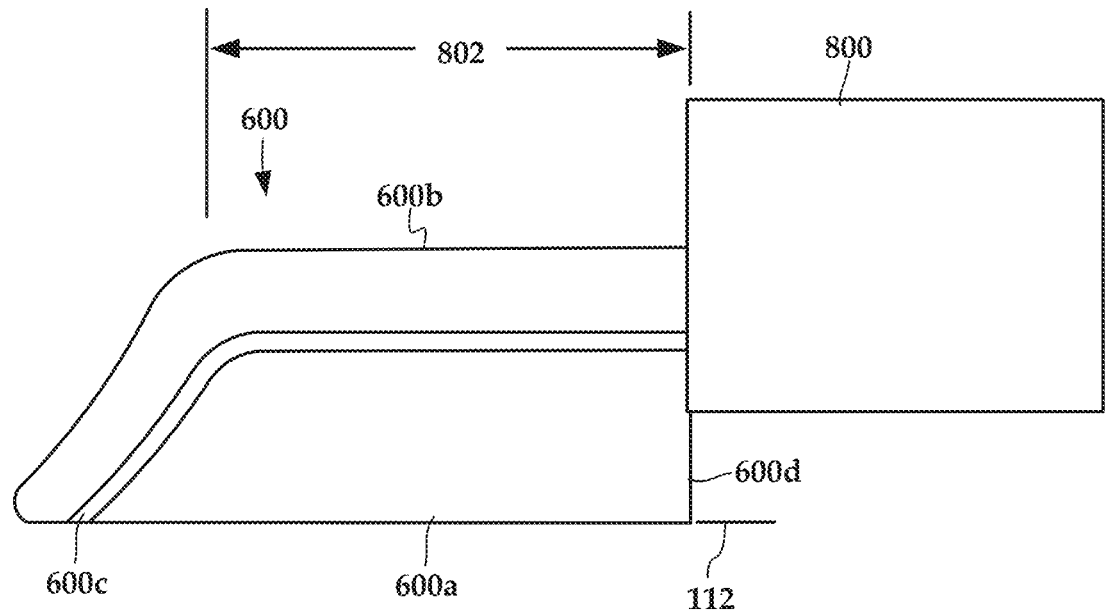
FIGS. 8 and 9 are plan views of a subwavelength mirrors according to other example embodiments.

In FIG. 8, a plan view shows an example of a heat sink 800 that may be used with a subwavelength mirror according to an example embodiment. For this example, the subwavelength mirror 600 from FIG. 6 is shown, however the heat sink 800 may be used with any other embodiment described herein. The heat sink 800 is thermally coupled to the liner 600b and may extend down to thermally couple with the intermediate layer 600c and/or core 600a. The heat sink 800 is located at a back edge 600d of the mirror, and may be recessed from the media facing surface 112 which can prevent damage to the heat sink 800, e.g., recession, separation, etc., if the heat sink 800 is made of Au or other soft metal. The heat sink 800 may extend to the media-facing surface 112 if made from a mechanically robust metal such as Rh, Ir, Pt, Pd, Ru, or alloys thereof. Increasing a cross-track dimension 802 of the mirror can also improve heat removal of the mirror 600 and heat sink 800, as well as minimizing optical interference at the NFT. For example, a baseline design may have a cross-track dimension 802 of around 500 nm, and this can be increased to any value greater than 500, e.g., up to 1500 nm for example.

Figure 9:
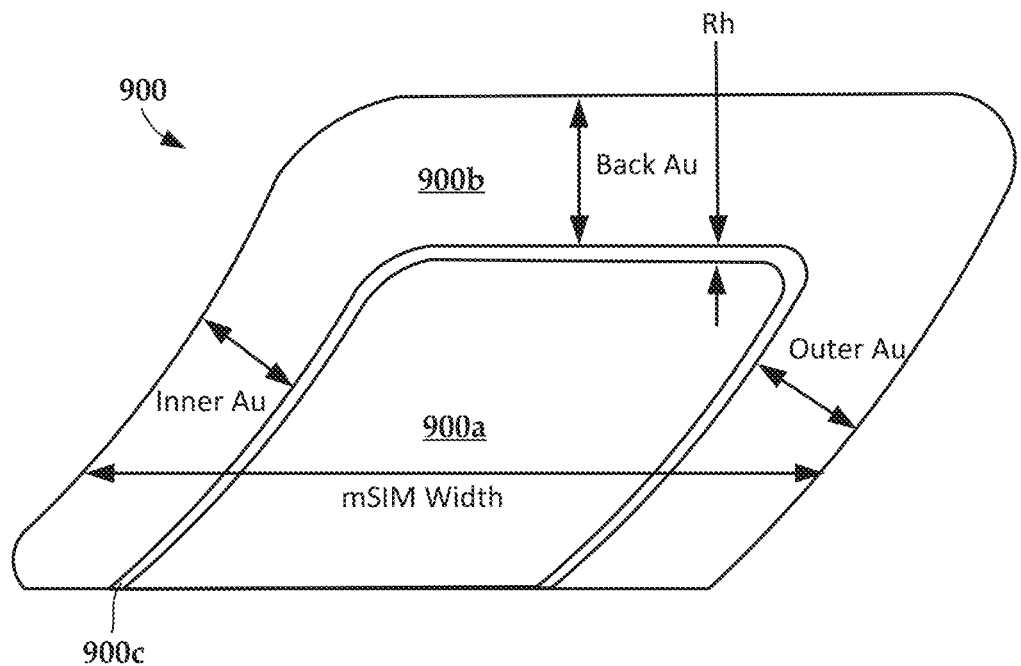
Figure 10:
FIGS. 10 and 11 are a table and graphs showing simulation results of a various configurations of a subwavelength mirror according to example embodiments.

The diagram in FIG. 9 shows a mirror 900 with a core 900a, liner 900b, and adhesion layer 900c. The dimensions marked in FIG. 9 are used in the table 1000 of FIG. 10, which shows the result of modeling done on subwavelength mirror designs according to example embodiments. The top row in the table 1000 in FIG. 10 is a gold subwavelength mirror that serves as a baseline for comparison with the other designs, which use a gold liner 900b, an AlO core 900a, and a Ru adhesion layer 900c. The last four columns in the table 1000 are the performance results, which include downtrack thermal gradient (DTTG) of the hotspot on the media, effective laser current ($I_{eff}$) applied to heat the media, and temperature increase ($\Delta T$) of the peg and subwavelength mirror.

The results in FIG. 10 show negligible impact on performance using a two-part mirror design, as the Au liner still provides performance comparable to a solid Au mirror. The thin Ru adhesion layer 900c doesn't significantly affect performance, nor does the Au portion at the back edge of the mirror (Outer Au), which was modeled as being removed (zero thickness) in all but one case. The only sensitive metric in table 1000 is the miniSIM temperature itself, which can be reduced by increasing its width and/or adding heatsink modules, as indicated in the last three rows of the table 1000. Note that the liner dimension of 100 nm is provided for purposes of example, and the liner may be thinner than this in some embodiments, e.g., 75 nm, 50 nm, 20 nm or less, and any value within that range.

Figure 11:
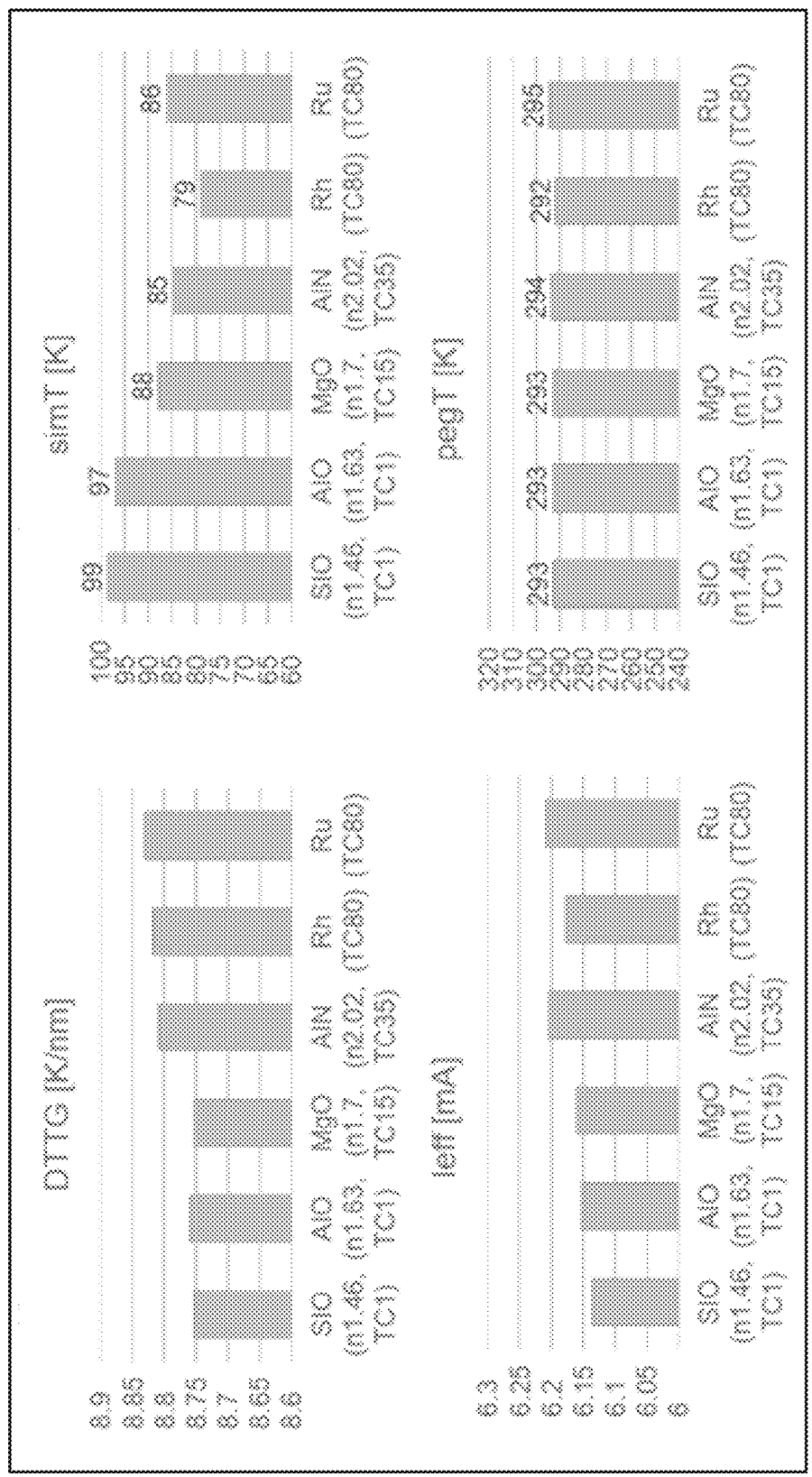

In FIG. 11, a set of graphs show further analysis results for different core materials. The results of each graph are the same as the last four columns in the table 1000 of FIG. 10. The optical properties (dielectric or metal) of filling material have negligible impact on optical performance (e.g., DTTG, $I_{eff}$, peg temperature) because Au is still covering performance-critical regions. The subwavelength mirror core can be filled with high thermal conductivity dielectrics or metals to reduce temperature of the subwavelength mirror. The core can also be filled with low coefficient of thermal expansion and high stiffness materials to reduce head protrusion.

Figure 12:
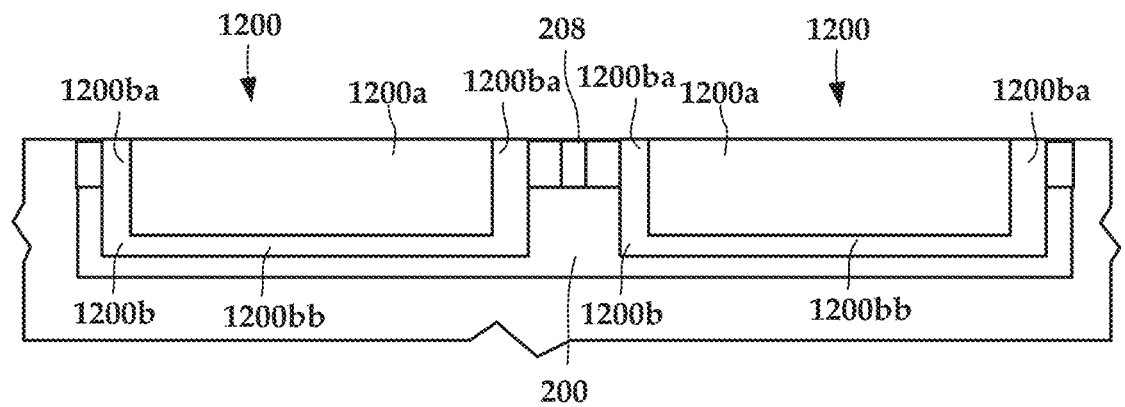
FIG. 12 is a media-facing-surface view of a subwavelength mirror according to another example embodiment.

In FIG. 12, a diagram shows a pair of subwavelength mirrors 1200 as seen from the media facing surface. In this view, it can be seen how the mirrors 1200 can be formed using a wafer deposition and etching process in one embodiment. Cavities that define the outer shape of the mirrors 1200 are etched into the waveguide core 200 and other surrounding materials (e.g., $SiO_2$, AlO). This etched out void is coated with a coating 1200*b* of the plasmonic material of the liner, which in this example forms both a liner 1200*ba* along the edges of the mirrors 1200 and a layer 1200*bb* of the plasmonic material over a major surface of the core, the major surface facing away from the NFT 208 in a downtrack direction. The core material 1200*a* is deposited over the coating 1200*b*. In this example, the coating 1200*b* is Au and the core material 1200*a* is Rh, and so there may be no need for an adhesion layer. In some embodiments, the layer 1200*bb* could be masked and/or removed so that just the liner 1200*ba* part is in each cavity when the core material 1200*a* is added.

Figure 13:
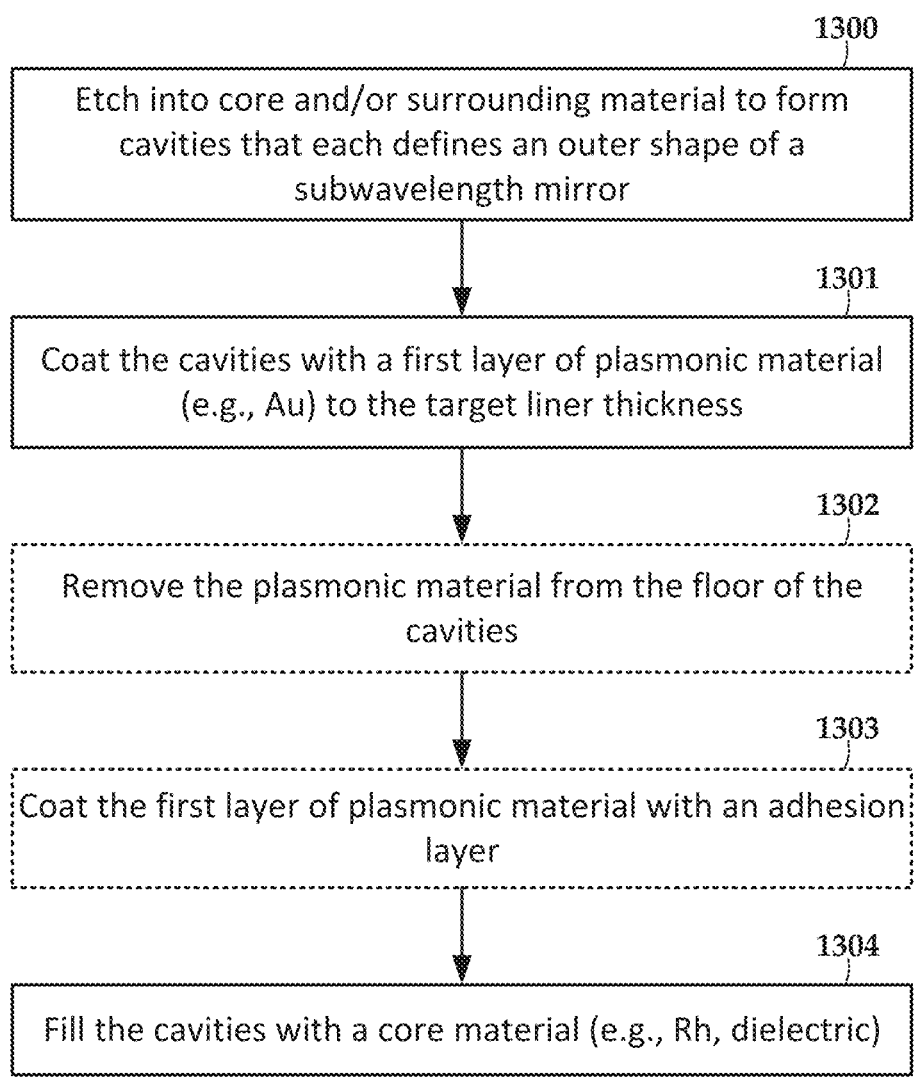
FIG. 13 is a flowchart of a method according to an example embodiment.

In FIG. 13, a flowchart shows a method of manufacturing subwavelength mirrors according to an example embodiment. An etching 1300 forms a cavity that defines an outer shape of each subwavelength mirror. The cavity is coated 1301 with a layer of plasmonic material. This coating step 1301 may be preceded by the application of a seed layer. Optionally, the plasmonic material can be removed 1302 from the floor of the cavity (e.g., corresponding to layer 1200*bb* in FIG. 12). Also optionally, the plasmonic material in the cavity can be coated 1303 with an intermediate layer for adhesion or for a diffusion barrier. Finally, the cavities are filled 1304 with a core material, e.g., a dielectric, a robust metal such as Rh, etc. Other processes may be performed to finalize the shape of the mirror, e.g., planarizing after filling the cavities 1304, lapping of the media-facing surface to expose the edge of the core at the media-facing surface, etc.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head comprising:
a near-field transducer proximate a media-facing surface of the recording head;
a waveguide that overlaps and delivers light to the near-field transducer; and
a pair of subwavelength focusing mirrors at an end of the waveguide proximate the media-facing surface, the subwavelength focusing mirrors on opposite crosstrack sides of the near-field transducer and separated from each other by a crosstrack gap, the subwavelength focusing mirrors each comprising:
a core comprising a first edge exposed at the media-facing surface, the core formed of a core material that is resistant to mechanical wear and corrosion; and
a liner covering a second edge of the core, the second edge of the core facing the near-field transducer, the liner comprising a plasmonic metal that is different than the core material.

2. The recording head of claim 1, wherein the liner of each subwavelength focusing mirror covers a back edge of the core, the back edge facing away from the near-field transducer and at a non-zero angle to the media-facing surface.

3. The recording head of claim 2, further comprising heat sinks thermally coupled to each liner at the back edge of each core.

4. The recording head of claim 1, wherein each core is formed from a dielectric, and a metallic adhesion layer is formed between each core and each liner.

5. The recording head of claim 4, wherein the dielectric comprises AlO, $SiO_2$, MgO, and AlN.

6. The recording head of claim 1, wherein each core is formed from Rh and each liner is formed of Al, and a diffusion barrier is formed between each core and each liner.

7. The recording head of claim 6, wherein the diffusion barrier comprises a metallic layer formed of Co, Ru, Ti, Cr, Pt, W, Ta, or TiWx, or alloys thereof, the metallic layer having a thickness between 5 and 30 nm.

8. The recording head of claim 6, wherein the diffusion barrier comprises a nitride layer formed TiNx, TaNx, AlNx, ZrNx, WNx, or HfNx, the nitride layer having a thickness between 5 and 30 nm.

9. The recording head of claim 6, wherein the diffusion barrier comprises one of an Al oxide or an Al alloy.

10. The recording head of claim 1, wherein each liner is less than four times a skin depth of the plasmonic metal.

11. The recording head of claim 1, wherein each core is formed from Rh, Ir, Pt, Pd, or Ru, or alloys thereof.

12. A recording head comprising:
a near-field transducer proximate a media-facing surface of the recording head, the near-field transducer extending a first distance away from the media-facing surface;
a waveguide that overlaps and delivers light to the near-field transducer; and
a pair of subwavelength focusing mirrors at an end of the waveguide proximate the media-facing surface and extending a second distance away from the media-facing surface that is less than the first distance, the subwavelength focusing mirrors on opposite crosstrack sides of the near-field transducer and separated from each other by a crosstrack gap, the subwavelength focusing mirrors each comprising:
a core comprising a first edge exposed at the media-facing surface, the core formed of a dielectric that is resistant to mechanical wear and corrosion;
a metal adhesion layer covering the core; and
a liner covering a second edge of the core facing the near-field transducer, the liner comprising a plasmonic metal that is different than the dielectric and the metal adhesion layer.

13. The recording head of claim 12, wherein the liner of each subwavelength focusing mirror covers a back edge of the core, the back edge facing away from the near-field transducer and at a non-zero angle to the media-facing surface, the recording head further comprising a heat sink thermally coupled to the liner at the back edge of the core.

14. The recording head of claim 12, wherein the liner is formed of Au.

15. The recording head of claim 12, wherein the dielectric comprises AlO, $SiO_2$, MgO, and AlN.

16. The recording head of claim 12, wherein the liner is less than four times a skin depth of the plasmonic metal.

17. A recording head comprising:
- a near-field transducer proximate a media-facing surface of the recording head, the near-field transducer extending a first distance away from the media-facing surface;
- a waveguide that overlaps and delivers light to the near-field transducer; and
- a pair of subwavelength focusing mirrors at an end of the waveguide proximate the media-facing surface and extending a second distance away from the media-facing surface that is less than the first distance, the subwavelength focusing mirrors on opposite crosstrack sides of the near-field transducer and separated from each other by a crosstrack gap, the subwavelength focusing mirrors each comprising:
  - a core comprising a first edge exposed at the media-facing surface, the core formed of a metallic core material that is resistant to mechanical wear and corrosion; and
  - a liner covering a second edge of the core facing the near-field transducer, the liner formed of Al or an alloy thereof.

18. The recording head of claim 17, further comprising a diffusion barrier between the core and the liner.

19. The recording head of claim 18, wherein the diffusion barrier comprises a metallic layer formed of Co, Ru, Ti, Cr, Pt, W, Ta, or TiWx, or alloys thereof, the metallic layer having a thickness between 5 and 30 nm.

20. The recording head of claim 18, wherein the diffusion barrier comprises a nitride layer formed TiNx, TaNx, AlNx, ZrNx, WNx, or HfNx, the nitride layer having a thickness between 5 and 30 nm.

* * * * *